United States Patent [19]

Williamson et al.

[11] Patent Number: 5,588,055
[45] Date of Patent: Dec. 24, 1996

[54] TELEPHONE HOLDER WITH MOUNTING ASSEMBLY

[76] Inventors: Robert Williamson, 7753 SE. Heather Ct., Milwaukie, Oreg. 97222; Alan Poole, 12685 SE. Sonoma, Clackamas, Oreg. 97015; Michael S. Weinert, 5715 SE. 17th, Portland, Oreg. 97202

[21] Appl. No.: 659,112

[22] Filed: Jun. 3, 1996

Related U.S. Application Data

[63] Continuation-in-part of Ser. No. 379,136, Jan. 27, 1995, abandoned.

[51] Int. Cl.$^6$ .................................................... H04M 1/00
[52] U.S. Cl. ........................ 379/446; 379/426; 379/454; 379/455
[58] Field of Search ................................. 379/426, 446, 379/449, 454, 455, 428, 435, 436; 248/592, 224.4, 225.2

[56] References Cited

U.S. PATENT DOCUMENTS

| | | |
|---|---|---|
| D. 309,307 | 7/1990 | Sigurdson . |
| D. 317,157 | 5/1991 | Jondelius . |
| D. 320,992 | 10/1991 | Jondelius . |
| D. 328,302 | 7/1992 | Murzanski et al. . |
| D. 339,809 | 9/1993 | Ron . |
| D. 350,545 | 9/1994 | Olkkola et al. . |
| 1,714,236 | 5/1929 | Peer ................................. 248/224.4 |
| 4,472,606 | 9/1984 | Kropp et al. . |
| 4,527,018 | 7/1985 | Offredi . |
| 4,747,136 | 5/1988 | Kiesewetter . |
| 4,998,277 | 3/1991 | Rioux, Jr. . |
| 5,040,712 | 8/1991 | Pesonen et al. . |
| 5,121,863 | 6/1992 | Kotitalo et al. . |
| 5,131,036 | 7/1992 | Dunchock . |
| 5,150,406 | 9/1992 | Dunchock . |
| 5,179,590 | 1/1993 | Wang . |
| 5,189,698 | 2/1993 | Hakanen . |
| 5,222,132 | 6/1993 | Rioux, Jr. . |
| 5,253,292 | 10/1993 | Fluder et al. . |
| 5,259,028 | 11/1993 | Westbrook . |
| 5,282,246 | 1/1994 | Yang . |
| 5,295,649 | 3/1994 | Lee . |

FOREIGN PATENT DOCUMENTS 5037619  2/1993  Japan ..................................... 379/428

*Primary Examiner*—Thomas W. Brown
*Assistant Examiner*—Jack Chiang
*Attorney, Agent, or Firm*—Kolisch, Hartwell, Dickinson, McCormack & Heuser

[57] ABSTRACT

The telephone-holding apparatus includes a holder for a wide variety of one-piece telephone models. The telephone holder also includes a mounting assembly for temporarily affixing the holder to the top edge of a generally vertical surface. The holder is designed to be used with a variety of different models of portable one-piece telephones. The holder has an upper peripheral rim with an opening designed to receive a one-piece telephone and also has a floor with a plurality of walls between the rim and the floor. When a phone is inserted into the holder, the held phone is laterally supported by the forward or lateral support wall of the holder. A spring mechanism connected to the back of the holder pushes the held telephone towards the forward or lateral support wall of the holder. The telephone holder mounting assembly is connected to the back wall of the telephone holder and is designed to temporarily mount the holder to a generally vertical surface with a top edge so that the holder remains stable and substantially level. The mounting mechanism or assembly contains two main parts. The first is hook-like bracket for mounting over the top edge of a generally vertical surface. The second is a spring-biased buttress that pushes against a generally vertical surface in order to stabilize and level the holder against the surface.

11 Claims, 3 Drawing Sheets

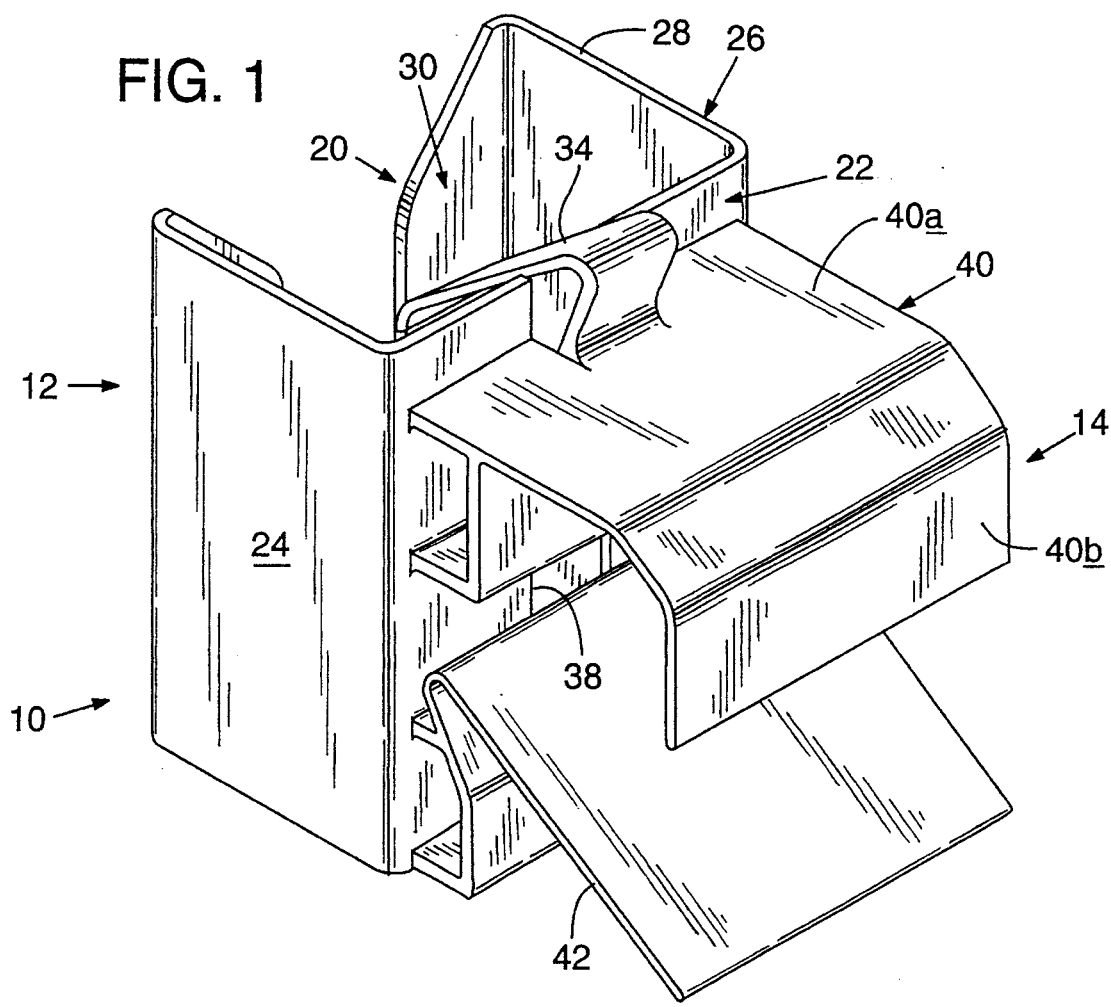
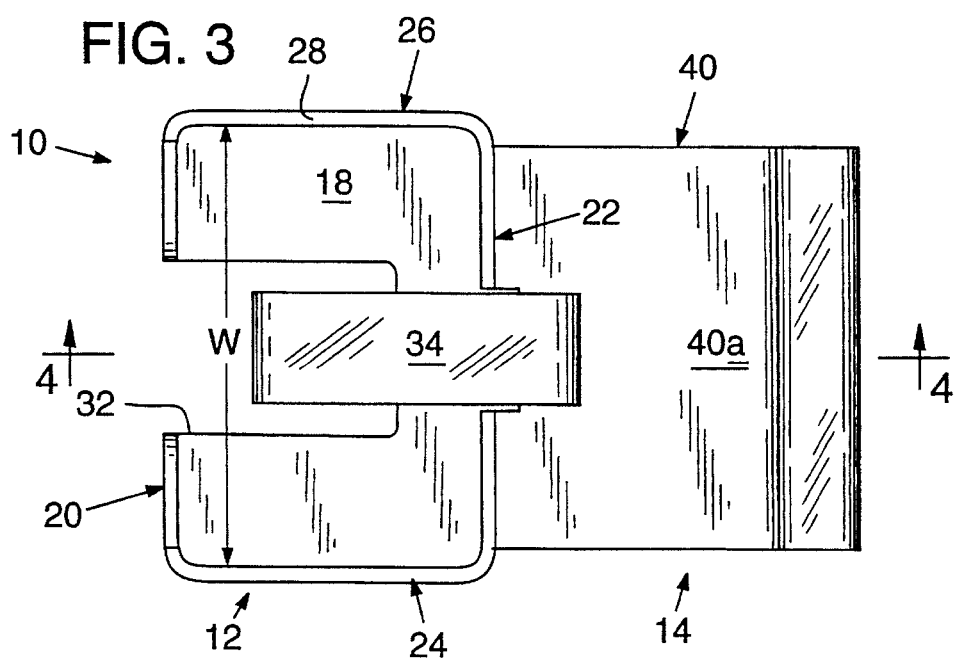

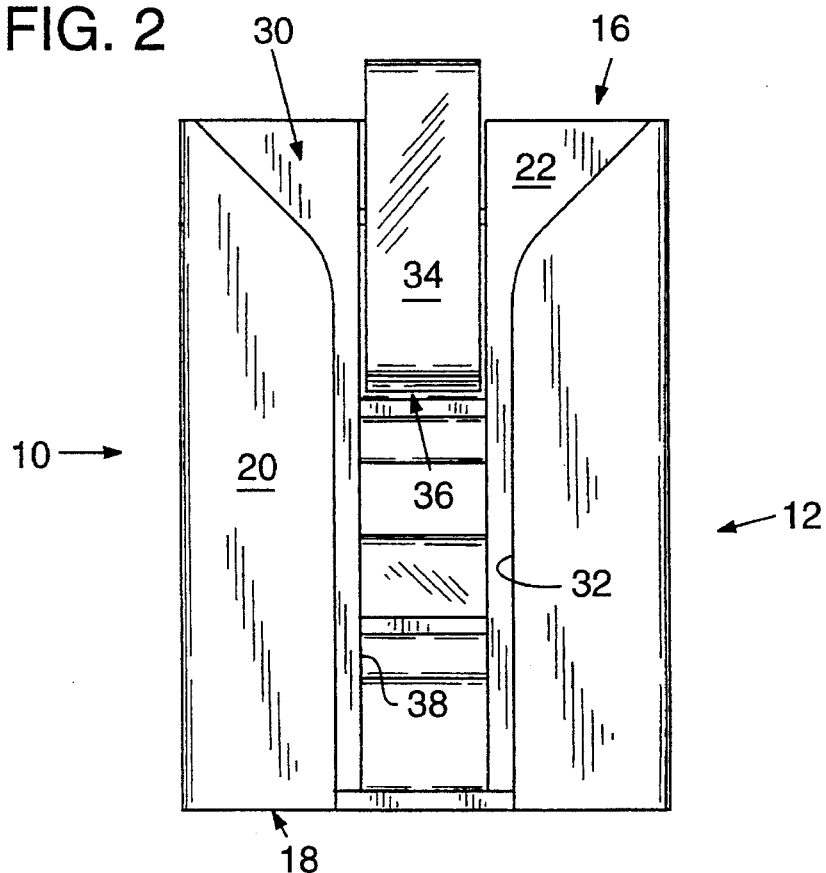
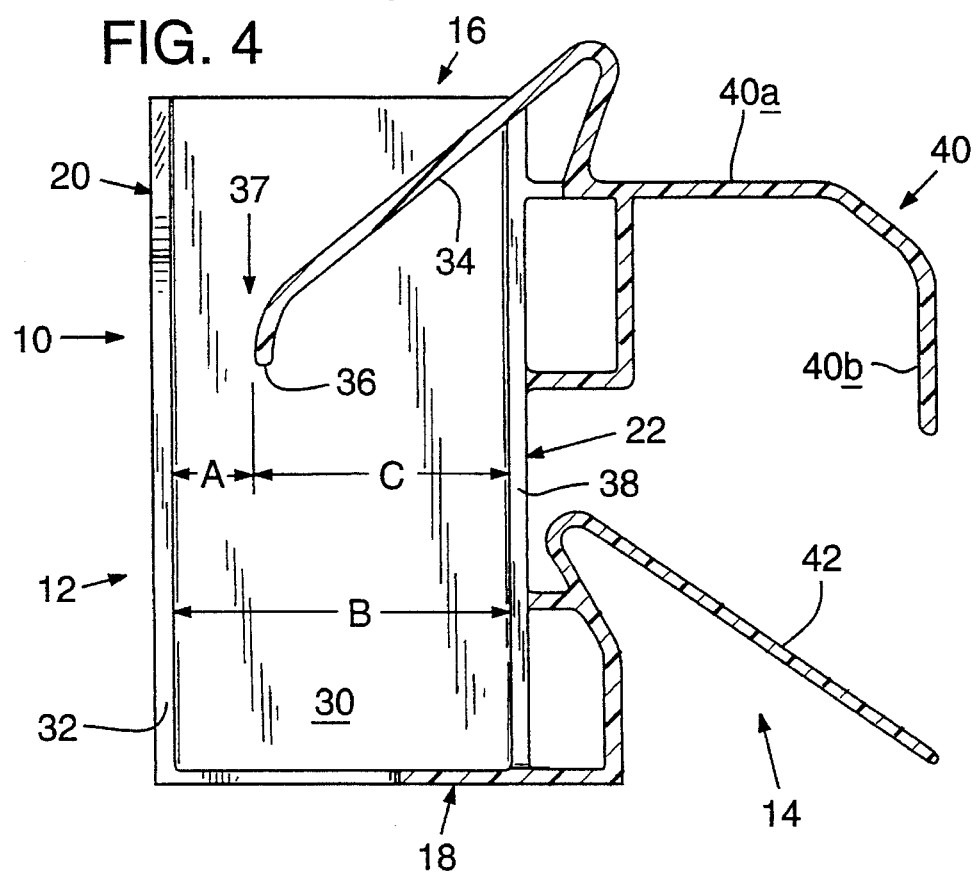

5,588,055

TELEPHONE HOLDER WITH MOUNTING ASSEMBLY

This is a continuation of application Ser. No. 08/379,136 filed Jan. 27, 1995 now abandoned.

BACKGROUND OF THE INVENTION

The present invention relates generally to a device for holding a portable cellular telephone and mounting such telephone to a vertical surface of the interior of an automobile.

Cellular telephones are used by many people with the need to stay in contact or remain accessible at any moment. When cellular phones were first developed, they were limited by their power source needs to rigid mounting platforms permanently installed in a vehicle on the dashboard, floorboard, or arm-rest glove box. These cellular phones were termed mobile telephones as they were restricted to the vehicle. Consumer demand for a phone that was not restricted to a vehicle led to the introduction of a bulky, portable cellular telephone equipped with an independent power supply referred to as transportable telephone. The latest cellular telephone models are portable telephones, notable for their lightweight, unrestricted use and compact battery source.

One-piece or single-unit cellular telephones are incorporated into the telephone handset. Many of these one-piece cellular phones have a removable power cord used to recharge the phone's batteries by plugging into a power source such as an automobile's cigarette lighter. People often have a need to use a cellular telephone while they are in an automobile and find that it is convenient to have their telephone centrally located or mounted to the dashboard of the automobile.

In the present state of the art, there are numerous types of holders for one-piece telephones or telephone handsets. These, however, are not suitable for accepting a wide variety of phone models and are dependent on a semi-permanent or permanent method of mounting the holder to the vehicle. Other drawbacks to the present state of the art of telephone holders include: 1) use limited to one type of phone; 2) mounting limited to one type of vehicle; 3) unable to hold telephone while the telephone's power cord is plugged in; and 4) removal of telephone is not easily performed using one hand.

SUMMARY OF THE INVENTION

The present invention includes a holder for a wide variety of one-piece telephone models. The present invention also includes a mounting assembly for temporarily affixing the holder to a generally vertical surface with a top edge.

The telephone holder is designed to be used with a variety of different models of portable one-piece telephones. The holder has a upper peripheral rim with an opening designed to receive a one-piece telephone. The holder also has a floor with a plurality of walls between the rim and the floor. When a phone is inserted into the holder, the held phone is laterally supported by the forward or lateral support wall of the holder. A spring mechanism connected to the back of the holder pushes the held telephone towards the forward or lateral support wall of the holder.

The telephone holder mounting assembly is connected to the back wall of the telephone holder and is designed to temporarily mount the holder to a generally vertical surface with a top edge so that the holder remains stable and substantially level. The mounting mechanism or assembly contains two main parts. The first is hook-like bracket for mounting over the top edge of a generally vertical surface. The second is a spring-biased buttress or brace that pushes against a generally vertical surface in order to stabilize and level the holder against the surface.

Thus, the object of the present invention is to overcome the drawbacks and limitations with the present state of the art of telephone holders. More specifically, the objects of the invention include providing the following independent of or collectively with each other:

1) a holder for a portable telephone that is simple, robust and economical to produce;

2) a holder of unitary construction;

3) a holder that is universal for nearly all portable telephones and is not specific to a portable telephone model;

4) a telephone holder mounting system that is interchangeable between vehicles and is temporarily affixed to the vehicle, thereby eliminating any need to alter the vehicle, its dashboard, floorboard, arm-rest glove box or glove box from its original manufactured form by any means, particularly through screws or adhesive methods;

5) a means of using a portable phone in conjunction with a battery saver accessory or the like without interfering with the electrical or power cord;

6) a shock dampening system for protecting the portable phone through the use of a spring mechanism;

7) a snug rest or support for a one-piece portable telephone through the use of a spring mechanism while retaining the phone through support on five sides and being held in place through gravity; and 8) a holder that allows the user to easily insert and remove the telephone using one hand.

These and other additional objects and advantages of the present invention will be more readily understood after consideration of the drawings and the detailed description of the preferred embodiment.

BRIEF DESCRIPTION OF THE DRAWINGS

FIG. 1 is an isometric view of a first embodiment of the present invention with the mounting assembly in the foreground;

FIG. 2 is a front elevation view of the embodiment of FIG. 1;

FIG. 3 is a plan view of the embodiment of FIG. 1;

FIG. 4 is a side elevation sectional view of the embodiment of FIG. 1 taken generally along line 4—4 in FIG. 3.

DETAILED DESCRIPTION OF THE PREFERRED EMBODIMENT OF THE INVENTION

Figure 5:
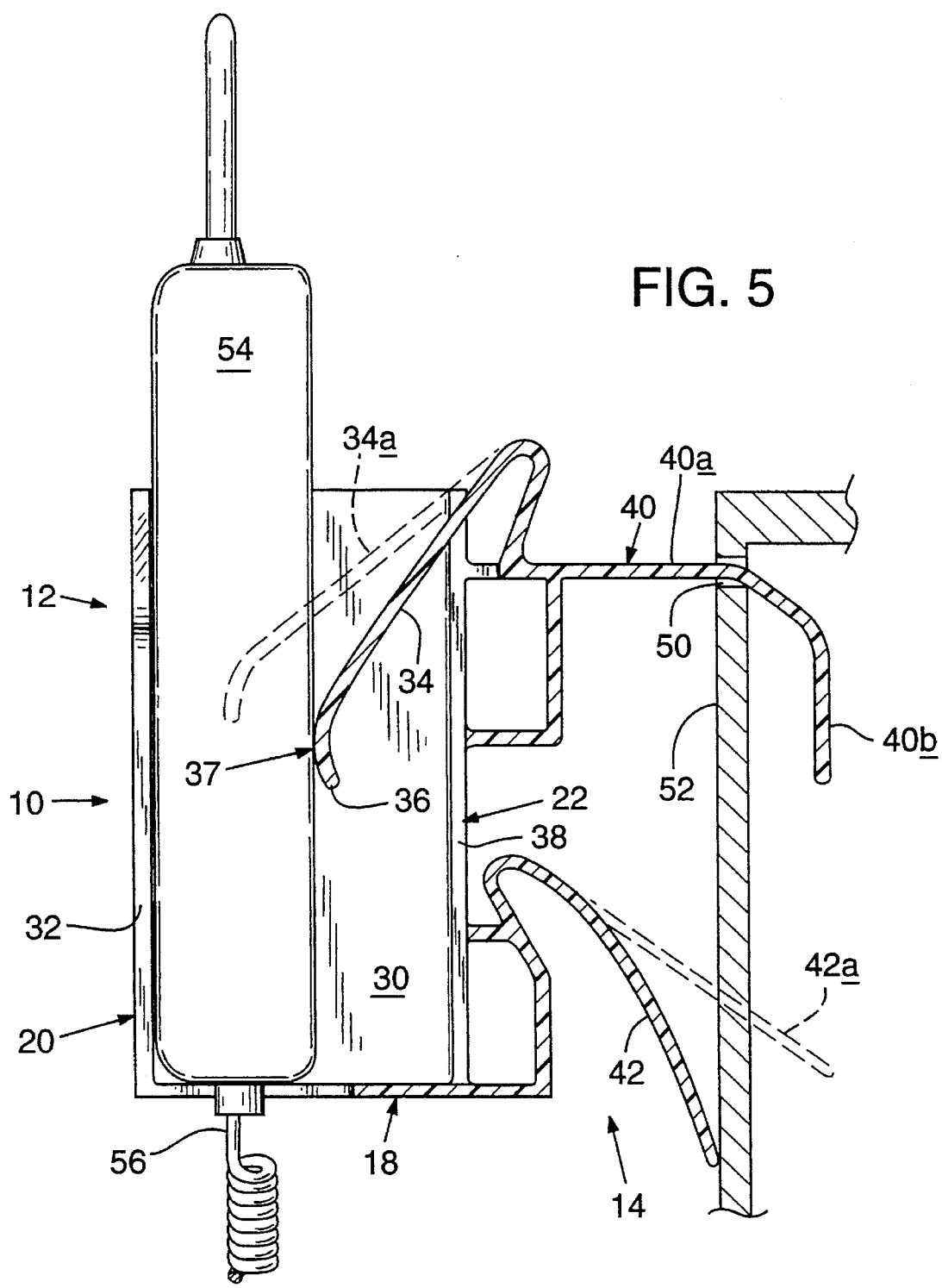
FIG. 5 corresponds to FIG. 4, but shows the preferred embodiment holding a telephone and mounted to a vehicle glove box.

As seen collectively in FIGS. 1 through 5, a telephone holder with a mounting assembly, made in accordance with the preferred embodiment of the invention, is shown at 10. Telephone holder with mounting assembly 10 includes a telephone holder 12 for holding a variety of models of portable one-piece telephones and a mounting assembly 14 connected to it, for temporarily mounting or affixing the telephone holder to a generally vertical surface.

Telephone holder 12 includes an upper peripheral rim 16 and an opposite floor 18 with at least one of a plurality of walls connected therebetween. Upper peripheral rim 16 has an opening 28 for receiving a telephone. A telephone held in the holder (i.e., a held telephone) rests on floor or base 18 and is laterally supported by at least one of the plurality of walls, namely, forward wall or lateral support wall 20. Telephone holder 12 includes a spring mechanism in the form of an elongate forwardly or laterally extending biasing member 34 that is designed to laterally push or urge a held telephone toward lateral support wall 20. Therefore, a held telephone is laterally supported on at least two opposites sides: by lateral support wall 20 and by spring mechanism 34. In addition, the held telephone may rest on floor 18.

In the preferred embodiment, telephone holder 12 is typically in the form of a rectangular box with a top, a bottom, and four sides. The top includes upper peripheral rim 16 and the bottom includes floor 18. The top and bottom are substantially equivalent in two-dimensional area. The four sides include a lateral support wall 20, a back or rearward wall 22 and two opposing sidewalls 24, 26. All of which are of substantially equal two-dimensional area.

When mounted to a vertical surface, upper peripheral rim 16 is substantially on top or upward facing such that the holder is level. Upper peripheral rim 16 has an opening 28 therein allowing the holder to receive a one-piece telephone into chamber 30 formed within the holder. A held telephone is a phone within chamber 30 of the holder.

Spring mechanism or laterally extending biasing member 34 of the telephone holder is configured to push a held telephone towards lateral support wall 20 of the holder when the telephone is held in the holder. Preferably, spring mechanism 34 is connected near the top and on the back wall of the holder. Laterally extending biasing member 34 includes a tip or end 36 that is located within chamber 30. Curved portion 37 of angular urging member 34 is adjacent end 36 such that the end is downwardly turned away from a held telephone. This feature allows the user to easily insert and remove a telephone from the holder without the end of the member unintentionally disconnecting the phone's power cord.

Accordingly, laterally extending biasing member 34 enables the holder to accept a wide variety of different portable telephone models while providing a snug and secure fit. When a phone is inserted into the holder, the member pushes or urges the phone toward the lateral support wall. FIG. 5 shows a held telephone 54 within the holder with a partially compressed laterally extending biasing member 34 pushing the telephone toward lateral support wall 20. Uncompressed laterally extending biasing member 34a is shown in phantom lines in FIG. 5.

As seen in FIG. 4, the holder can accommodate a wide range of phone sizes or depths. The range of phone depths is from just greater than zero to just less than depth B (as seen in FIG. 4.). A phone having at least a depth just greater than depth A can be snugly and securely 2held by the holder. Depth C indicates the range of phone sizes that the holder can accommodate. The holder can accept a phone depth of A to A+C (which equals B). Moreover, the holder can accommodate a phone of any width less than width W (as seen in FIG. 3) and it can accommodate a phone of any height because opening 28 in the top of the holder.

The holder has a downwardly extending elongate first slot 32 centrally located in one of the plurality of walls. In addition, the floor has a central orifice. Preferably, first slot 32 extends downwardly continuously into the floor to form the central orifice. When the holder is used in an automobile, a removable power cord is used to plug a one-piece portable phone into a power source (such as an automobile's cigarette lighter) to save the phone's battery charge and/or to recharge the phone's battery. First slot 32 allows a corded phone to be quickly and easily inserted into and removed from the holder without removing the power cord. FIG. 5 shows a held phone with an attached cord 56 extending through first slot 32. In the preferred embodiment of the invention, first slot 32 is centrally located in lateral support wall 20.

Back wall 22 of the holder has a second slot 38 designed to receive end 36 of angular urging member 34 when the member is fully compressed by a sufficiently large telephone inserted into the holder. Thus, if a phone was inserted into the holder having a depth near depth B (of FIG. 4), then second slot 38 will receive end 36 of member 34.

Telephone holder mounting assembly 14 is connected to telephone holder 12 and is designed for the temporary mounting of the holder to a top edge of a generally vertical surface. FIG. 5 shows the mounting assembly temporarily mounted to a glove box of a car. The mounting assembly includes a rearwardly and downwardly extending dashboard mounting member in the form of an angular or hook-like bracket 40 for temporarily mounting over a top edge 50 of a generally vertical surface 52 (such as a glove box). The mounting assembly also includes a rearwardly extending biasing member in the form of a spring-biased buttress or brace 42 for stabilizing and leveling the holder against the generally vertical surface. Bracket 40 is connected to the holder and/or connected to buttress 42. Preferably, bracket 40 is above buttress 42 so that the bracket can hook onto a top edge of a generally vertical surface and the buttress can push against that surface.

Mounting assembly 14 provides a stable and strong means of temporarily mounting or affixing a telephone holder to a generally vertical surface without damaging or marring the surface. Permanent or semi-permanent affixation can damage or mar the surface. Such permanent or semi-permanent affixation can include adhesives, screws, rivets, bolts, welds, and other similar marring or damaging attachment means. If a holder is temporarily mounted to a surface using mounting assembly 14, the surface is not permanently damaged or altered with sticky adhesives, cuts, holes, marks, and other marring effects.

The stable, strong, and temporary affixation of a telephone holder by the mounting assembly is accomplished by two key structures: an angular bracket 40 and a spring-biased buttress 42. As seen in FIG. 5, the bracket hooks over top edge 50 of a generally vertical surface 52 (which can be a glove box, a dashboard, a door, an arm-rest, or any other generally vertical surface with a top edge). Bracket 40 includes a rearwardly extending or horizontal portion 40a and a downwardly extending or vertical portion 40b. The horizontal portion extends or projects substantially horizontally from the back wall of the telephone holder. The vertical portion extends substantially vertically and downwardly from the horizontal portion, thereby producing a hook-like bracket.

Once bracket 40 is hooked over the top edge of vertical surface 52, spring-biased buttress 42 contacts the surface and pushes against the surface. In the preferred embodiment, spring-biased buttress is a broad, angular expanse or a substantially planar expanse acutely extending rearwardly and downwardly away from the back wall. The buttress may take other forms, such as a coil spring, leaf spring, or other spring-biased structures, without departing from the spirit and scope of the invention. As shown in FIG. 5, spring-biased buttress 42 gives or compresses, thereby providing a stable and leveling support for the holder, and the buttress dampens much of the vibration produced by an operating automobile to provide a stable and firm support for a held phone. An uncompressed buttress 42a is shown in phantom line in FIG. 5.

Preferably, the invented holder and mounting assembly is integrally formed from a polymer. Those who are skilled in the art will understand that other suitable materials may be used that are sufficiently sturdy and the invention may be assembled from a plurality of pieces without departing from the spirit and scope of the invention.

While the present invention has been shown and described with reference to the foregoing preferred embodiment, it will be apparent to those skilled in the art that other changes to the form, and detail may be made therein without departing from the spirit and scope of the invention as defined in the impending claims.

We claim:

1. A telephone holder mounting assembly connected to a back wall of a telephone holder, wherein the mounting assembly is for mounting the holder to a top edge of a generally vertical surface, the mounting assembly comprising:

a hooking bracket for mounting over the top edge of the surface, wherein the bracket includes a rearwardly extending portion projecting from the back wall and a downwardly extending portion extending therefrom, and a spring-biased buttress for stabilizing and leveling the holder against the surface by contacting and pushing against the surface, wherein the buttress is connected to the back wall and when not contacting the surface, the buttress is a substantially planar expanse which acutely extends rearwardly and downwardly away from the back wall and, when contacting the surface while the holder is mounted thereto, the buttress bends so that the buttress does not extend past a plane defined by the vertical surface.

2. The mounting assembly of claim 1, wherein the mounting assembly does not alter the surface when the mounting assembly mounts to the top edge of the surface.

3. A mountable telephone holder for holding different models of portable telephones, the mountable telephone holder comprising:

a plurality of walls extending from the upper peripheral rim including a lateral support wall for laterally supporting a held telephone, the plurality of walls defining an upper peripheral rim with an opening therein for receiving a telephone such that a telephone is held in the holder, the lateral support wall defining a downwardly extending elongate first slot;

a floor opposite the upper peripheral rim and connected to at least one of the plurality of walls, wherein the floor defines a central orifice;

a spring mechanism connected to the holder and configured to laterally push a held telephone toward the lateral support wall; and a mounting assembly connected to one of the plurality of walls, wherein the mounting assembly is for affixing the holder to a top edge of a generally vertical surface, the mounting assembly comprising:

a hooking bracket for mounting over the top edge of the surface, wherein the bracket includes a rearwardly extending portion projecting from the back wall and a downwardly extending portion extending therefrom, and a spring-biased buttress for stabilizing and leveling the holder against the surface by contacting and pushing against the surface, wherein the buttress is connected to the back wall and, when not contacting the surface, the buttress is a substantially planar expanse which acutely extends rearwardly and downwardly away from the back wall and, when contacting the surface while the holder is mounted thereto, the buttress bends so that the buttress does not extend past a plane defined by the vertical surface.

4. The mountable telephone holder of claim 3, wherein the spring mechanism is a laterally extending biasing member with an end located within the holder.

5. The mountable telephone holder of claim 4, wherein the laterally extending biasing member includes a curved portion adjacent the end, wherein the curved portion pushes the telephone toward the lateral support wall.

6. The mountable telephone holder of claim 4, wherein a back wall is one of the plurality of walls, the back wall including a second slot to receive the end of the laterally extending biasing member when the member is fully compressed.

7. The mountable telephone holder of claim 3, wherein a back wall is one of the plurality of walls, the back wall including a second slot to receive the end of the laterally extending biasing member when the member is fully compressed.

8. The mountable telephone holder of claim 3, wherein the first slot is adapted to receiving a cord of a telephone.

9. A telephone holder for holding a portable telephone in a vehicle for mounting the telephone to the vehicle dashboard, comprising:

four substantially vertical walls including a forward and rearward wall and two opposing sidewalls, the walls terminating in a floor;

a rearwardly and downwardly extending dashboard mounting member extending from the rearward wall;

a forwardly and downwardly extending biasing member extending from the rearward wall so that, when the telephone is within the holder, the forwardly and downwardly extending biasing member contacts the telephone so as to bias the telephone toward the forward wall and away from the rearward wall; and a rearwardly extending biasing member mounted below the dashboard mounting member for stabilizing and leveling the holder against the dashboard by contacting and pushing against the dashboard.

10. The telephone holder of claim 9, wherein the forwardly and downwardly extending biasing member includes a downwardly curved end.

11. The telephone holder of claim 9, wherein the forward wall defines an elongate first slot and the floor defines a central orifice so that the first slot extends downwardly continuously into the floor to form the central orifice.

\* \* \* \* \*